United States Patent [19]

DePuy

[11] 4,314,327
[45] Feb. 2, 1982

[54] TRANSISTOR DRIVE CONTROL FOR A MULTIPLE INPUT D.C. TO D.C. CONVERTER

[75] Inventor: Robert P. DePuy, Cherry Hill, N.J.

[73] Assignee: General Electric Company, Philadelphia, Pa.

[21] Appl. No.: 207,586

[22] Filed: Nov. 17, 1980

[51] Int. Cl.³ .......................................... H02M 3/335
[52] U.S. Cl. ..................................... 363/142; 363/22; 363/56; 363/133
[58] Field of Search ...................... 363/22–26, 363/55–56, 95, 97, 131, 133, 134, 142

[56] References Cited

U.S. PATENT DOCUMENTS

| 3,689,825 | 9/1972 | Mason et al. | 363/133 |
| 3,889,173 | 6/1975 | Klusmann et al. | 363/21 |
| 3,947,754 | 3/1976 | Wechsler | 363/126 |
| 4,187,536 | 2/1980 | Govaert et al. | 363/97 |

OTHER PUBLICATIONS

Abraham I. Pressman, Switching and Linear Power Supply, Power Converter Design, paragraph 2.4.2.

Primary Examiner—William M. Shoop
Assistant Examiner—Peter S. Wong
Attorney, Agent, or Firm—William Freedman; John P. McMahon

[57] ABSTRACT

A D.C. to D.C. voltage converter is disclosed that operates with various applied D.C. input voltages, each having a different voltage level, to develop a desired D.C. output voltage. The D.C. to D.C. voltage converter has a saturable transformer that is sequentially excited into its positive and negative saturation conditions under control of sequentially operating first and second transistor diode combinations. The D.C. to D.C. converter has a base drive current circuit comprised of a full-wave rectifier and a multiple level current limiting circuit. The base drive current circuit is interposed between a base drive winding of the saturable transformer and the base electrodes of the transistors of first and second transistor diode combinations. The base drive circuit adapts the saturation condition of the first and second transistor diode combinations to the level of the applied D.C. input voltages so as to reduce the level of increase of the commutational losses of the transistor-diode combination that may otherwise occur for increases in the level of the applied D.C. input voltages.

6 Claims, 3 Drawing Figures

TRANSISTOR DRIVE CONTROL FOR A MULTIPLE INPUT D.C. TO D.C. CONVERTER

BACKGROUND OF THE INVENTION

This invention relates to a D.C. to D.C. voltage converter, and more particularly, to a D.C. to D.C. voltage converter having a base drive circuit that reduces the increases in commutational losses of transistor switching devices normally caused by voltage increases of applied input D.C. voltages to the D.C. to D.C. voltage converter.

D.C. to D.C. voltage converters employing a saturable transformer to provide D.C. isolation between an input D.C. voltage and an output D.C. voltage are well known. A description of one such D.C. to D.C. converter is given in "Switching and Linear Power Supply, Power Converter Design" by Abraham I. Pressman, published in 1977 by Hayden Book Company, Inc., in particular, paragraph 2.4.2. of this text. entitled "Single-Transformer, Square-Wave Power Oscillator Converter (Often Referred to as a Royer Oscillator)."

The Royer oscillator essentially comprises a saturable transformer arranged with a pair of switching transistors. The switching transistors operating in their saturation condition cause the saturable transformer to be sequentially driven into its negative and positive saturation conditions to develop a square-wave type output across a secondary winding of the transformer. The switching transistors experience commutational losses as they transfer from their blocking or non-conductive state to their switching or conductive state. This transfer occurs each time the transformer is driven into its saturation conditions.

The rate at which the transformer is driven into its saturation conditions is essentially dependent upon two parameters; (1) the instantaneous rate of change of magnetic flux dB/dt related to the transformer's number of turns and the area of iron, and (2) the voltage applied to the primary winding of the transformer. The dB/dt quantity contributes to the frequency of operation of the D.C. to D.C. converter. The level of the D.C. voltage applied to the D.C. to D.C. converter contributes to the determination of the dB/dt quantity. Similarly, the level of the applied D.C. voltage typically contributes to the determination of the base drive current of the switching transistors, which, in turn determines the amount the switching transistors are driven into their saturation condition.

It is desirable that D.C. to D.C. voltage converters have the capability of receiving a plurality of input D.C. voltages whose voltage levels have a large deviation yet produce a D.C. voltage output which remains substantially the same. For example, it is desirable that if a D.C. to D.C. voltage converter receives an input D.C. voltage of 48 volts it produces a D.C. output voltage of 24 volts and that the D.C. output voltage of 24 volts is substantially maintained when the input D.C. voltage received is increased to 125 volts.

It is known that the output D.C. voltage may be maintained at approximately the same value by providing a tap on the secondary winding of the transformer to correspondingly change the desired number of turns when the input D.C. voltage is changed.

However, increases in the D.C. voltage also increase three parameters; (1) the voltage applied to switching transistors during commutation, (2) the frequency of operation of the D.C. to D.C. converter, and (3) the base drive current applied to the switching transistors. Increase in these three parameters have a cumulative effect of increasing the commutational losses of the switching transistors which may degrade the performance or even damage the transistors.

Accordingly, it is an object of the present invention to provide a D.C. to D.C. voltage converter capable of receiving D.C. voltages, whose levels have a large variation, for developing a desired D.C. output voltage, while minimizing the increase in the commutational losses of the transistor switching devices that may otherwise occur for such large variations.

It is another object of the present invention to provide a base drive current to the transistor switching devices that compensates for major and minor variations in the applied D.C. voltage so as to reduce the increase in the commutational losses of the switching transistors that may otherwise occur for both such major and minor variations.

It is another object of the present invention to provide a base drive current to the transistor switching devices that compensates for major and minor variations in the applied D.C. voltages so as to reduce the increase in the commutational losses of the switching transistors that may otherwise occur for both such major and minor variations.

These and other objects of the invention will become apparent to those skilled in the art upon consideration of the following description of the invention.

SUMMARY OF THE INVENTION

In carrying out the invention in one form, I provide a D.C. to D.C. voltage converter that operates with major and minor variations in the level of applied input D.C. voltage and reduces the commutational losses of its switching transistors that may otherwise occur for the major and minor increases of the input D.C. voltages.

The D.C. to D.C. voltage converter is adapted for energization by various input D.C. voltages each having different voltage levels relative to each other and each having a positive and negative potential. The positive potential is connected to a center-tap of a primary winding of a saturable transformer. The saturable transformer has a first secondary or base drive winding having a first and a second end and a second secondary winding having a first and a second end with a tap positionable between its first and second ends. The saturable transformer has a core with a substantially square magnetic hysteresis loop characteristic. The negative potential is connected to a first and a second transistor diode combination which sequentially operate to couple the negative potential to opposite ends of the primary winding, causing the core of the saturable transformer to be sequentially excited into its positive and its negative saturation conditions. The first and second transistor diode combinations are controlled by a base drive circuit having a starting resistor with a first end connected to the positive potential and a second end. The base drive circuit is connected in series with the transistor diode combinations and the base drive winding of the saturable transformer. The base drive winding has an A.C. voltage across its first and second ends representative of the D.C. voltage present at the primary winding. The base drive winding voltage experiences a rapid reversal as the transformer is excited into its negative and positive saturation conditions. The rapid reversal causes the base drive circuit to sequentially render conductive and non-conductive the first and the second transistor diode combinations. The sequential conduction of the first and second transistor diode combinations allows the transformer to be sequentially driven into its saturation conditions, which, in turn, develops a time-varying signal at the second secondary winding of the transformer which is rectified by an A.C. to D.C. converter to develop a desired D.C. output voltage. The base drive circuit further comprises means for converting the A.C. voltage of the base drive winding into a representative D.C. output voltage and a multiple level current limiting circuit.

The means for converting has a first end coupled to the first end of the base drive winding and a second end coupled to the second end of the starting resistor and to a base electrode of a transistor of the first transistor diode combination. The D.C. output voltage of the means for converting is coupled across the multiple level current limiting circuit. The multiple level current limiting circuit develops a current representative of the coupled D.C. output voltage. The current has a first and a second range representative of a first and a second range of the coupled D.C. output voltage. The first and second ranges of the coupled D.C. output voltage are respectively representative of a range of D.C. voltage levels of a first input D.C. voltage and a range of D.C. voltage levels of a second input D.C. voltage. The means for converting and the multiple level current limiting circuit are arranged to supply as a base drive current the first and second ranges of currents to the base electrodes of the first and second transistor diode combinations. The first and second ranges of currents correspondingly control the saturation condition of the first and second transistor diode combinations. The first and second ranges of currents adapt the saturation condition of the first and second transistor diode combinations to the ranges of the first and second input D.C. voltages. The adaptation of the saturation condition of the first and second transistor diode combinations to the first and second input D.C. voltage applied to the D.C. to D.C. converter reduces the extent of the increase in the commutational losses for each of the first and second transistor diode combinations which may otherwise result from major and minor positive increases in the D.C. voltage levels of the applied first and second D.C. voltages.

The features of the invention believed to be novel are set forth with particularlity in the appended claims. The invention, itself, however, both as to its objects and method of operation, together with further objects and advantages thereof may be best understood by reference to the following description taken in conjunction with the accompanying drawings.

DETAILED DESCRIPTION OF THE PREFERRED EMBODIMENT

Figure 1:
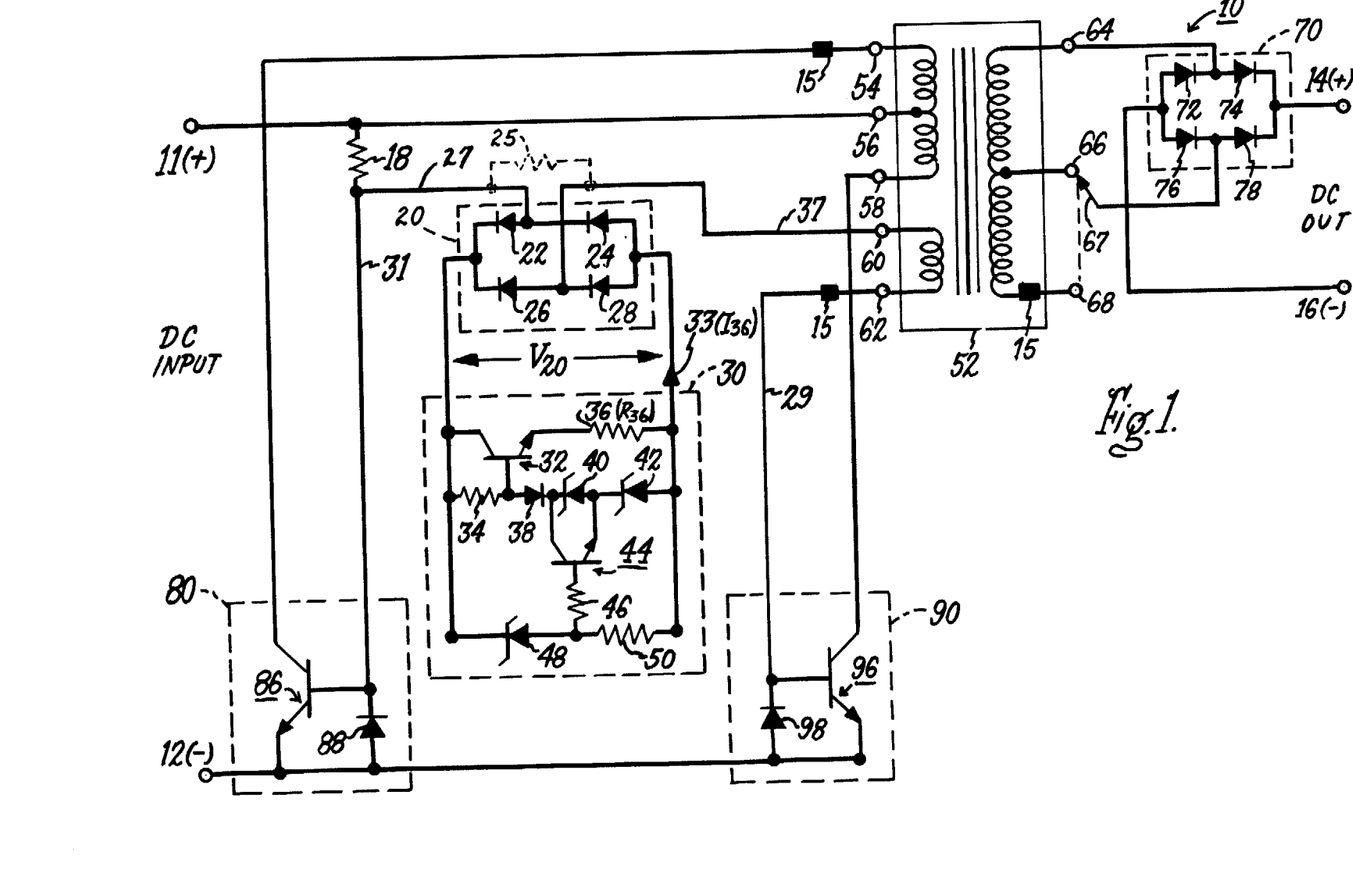
FIG. 1 is a circuit diagram showing one embodiment of the present invention.

FIG. 1 shows a D.C. to D.C. converter 10 which converts an input D.C. voltage present across input terminals 11 and 12 to a D.C. output voltage across output terminals 14 and 16. The D.C. to D.C. converter 10 is mainly comprised of a saturable transformer 52, a first and a second transistor-diode combination 80 and 90, respectively, a full-wave rectifier 70, a full-wave rectifier 20, and a multiple level current limiting circuit 30.

Saturable transformer 52 is a conventional type having a core with a substantially square magnetic hysteresis loop characteristic. The core of transformer 52 is commonly formed from a ferrite material. Transformers of this type are available from TOROTEL INC., Grandview, Mo., 64030, as their TC series.

The transformer 52, as shown in FIG. 1, has a primary winding with a center-tap interconnected to terminals 54, 56 and 58, a first secondary winding with a tap interconnected to terminals 64, 66 and 68, and a second secondary or base drive winding interconnected to terminals 60 and 62. The saturable transformer 52 provides a means of potential isolation between the applied input D.C. voltage, the developed output D.C. voltage and the base drive voltage for the transistor-diode combinations 80 and 90. From FIG. 1 it should be noted that transformer 52 has its polarity marking 15 located at terminals 54, 62 and 68.

The full-wave rectifier 70 comprises diodes 72, 74, 76 and 78 and is arranged in a conventional manner as shown in FIG. 1. One side of the full-wave rectifier 70 is connected to the secondary winding of transformer 52 via terminal 64. The second side of the full-wave rectifier is switchably connected, via switch 67, to terminal 66 or 68 of transformer 52. Switch 67 is used to select the desired number of turns for the secondary winding of transformer 52 in accordance with various input D.C. voltages applied to terminals 11 and 12. For example, if a D.C. voltage of about 125 V is applied to the input terminals 11 and 12 then switch 67 is positioned to terminal 66, whereas if a D.C. voltage of about 48 V is applied to input terminals 11 and 12 then switch 67 is positioned to terminal 68. The full-wave rectifier 70 operates in a well-known manner to convert a time-varying signal that may be present at the secondary winding of transformer 52 into a D.C. voltage that is applied between output terminals 14 and 16.

The positive polarity of the D.C. input voltage, applied to terminal 11, is connected to the center-tap of the primary winding via terminal 56 of the transformer. The negative or ground potential of the D.C. input voltage, applied to terminal 12, is coupled to terminal 54 or 58 of the primary winding by transistor diode combination 80 or 90 respectively. The D.C. to D.C. converter of FIG. 1 with the exclusion of the combination of the full-wave rectifier 20 and the multiple level current limiting circuit 30 is well known. In order to more fully appreciate the inventive concept of the preferred embodiment, the operation of the D.C. to D.C. converter 10 excluding the operation of the combination of the full-wave rectifier 20 and the multiple level current limiting circuit 30 will be first described.

In general, the D.C. to D.C. converter 10 operates such that the saturable core of transformer 52 is sequentially excited into its positive and its negative saturation conditions by control of transistor-diode combinations 80 and 90, respectively. A transistor 86 of transistor-diode combination 80, is rendered conductive by a drive current, which after a brief period drives the transistor 86 into its saturated state. The excitation current for transformer 52 flows through transistor 86 to excite transformer 52 until the source voltage, that is the D.C.

input voltage applied across terminals 11 and 12, drives transformer 52 into the positive saturation condition. Similarly, a transistor 96 of transistor-diode combination 90 rendered conductive by a drive current, which after a brief period drives the transistor 96 into its saturation state. The excitation current for transformer 52 flows through transistor 96 to excite transformer 52 until the same source voltage drives transformer 52 into the negative saturation condition.

For the following description of the operation of a circuit arrangement 10 that excludes the operation of the full-wave rectifier 20 and multiple level current limiting circuit 30 combination, it should be understood that terminal 60, shown in FIG. 1, is to be connected to one end of a starting resistor 18 via a resistor 25 (shown in dotted lines). It should also be understood that transistors 86 and 96 have substantially the same characteristics. The starting resistor 18 and bias resistor 25 are arranged between transistors 86 and 96 such that transistor 86 is provided with a lower resistance path to an applied positive potential at terminal 11 relative to the resistance path of transistor 96. The application of the positive potential establishes a higher drive current from the base to emitter of transistor 86 relative to the drive current between the base and emitter of transistor 96 via the higher resistance path of the resistor 25 and the inherent resistance of the base winding of transformer 52. A diode 88 is connected between the emitter and the base of transistor 86 and becomes conductive when the base to emitter of the transistor 86 is back-biased to the normal forward drop of diode 88. Similarly, a diode 98 is connected between the emitter and the base of transistor 96 and becomes conductive when the base to emitter of transistor 96 is back-biased to the normal forward drop of diode 98.

Upon the application of the positive potential of the input D.C. voltage at terminal 11, transistor 86 begins to conduct, which, in turn, allows the negative potential of the input D.C. voltage present at terminal 12 to be coupled to terminal 54 of the transformer 52 correspondingly causing the voltage potential at terminal 60 relative to terminal 62 to increase in a positive direction. The increasing positive potential correspondingly causes an increase to the current applied to the base of transistor 86 through resistor 25. The current applied to the base of transistor 86 and also to the base of transistor 96 will be hereinafter referred to as "base drive current". Increasing the base drive current applied to transistor 86 lowers the collector-to-emitter voltage of transistor 86 and correspondingly causes an increase in the rate at which transistor 86 is driven into its saturation condition. The base-to-emitter current of transistor 86 is returned to transformer terminal 62 via diode 98.

As the transformer 52 is driven into its positive saturation condition, the inductance of the transformer 52 suddenly decreases or collapses towards a zero condition. The sudden collapse of inductance of transformer 52 causes a sudden reversal of the base drive voltage for the transistors 86 and 96 existing between terminals 60 and 62 of transformer 52. The sudden reversal of the voltage between terminals 60 and 62 causes the removal of the base drive current to transistor 86 so as to inhibit its conduction, and substantially simultaneously further causes the establishment of a base drive current to transistor 96 so as to initiate its conductive state. As similarly discussed with regard to transistor 86, the voltage potential now present at terminal 62 relative to terminal 60 increases in a positive direction, correspondingly increasing the rate at which transistor 96 is driven into its saturation condition.

Conduction of transistor 96 in its saturation condition allows the core of transformer 52 to be driven into its negative saturation condition. As transformer 52 is driven into its negative saturation condition its inductance again suddenly collapses and the conductive states of transistors 96 and 86 are reversed in a similar manner as previousy described for transistors 86 and 96. The above given sequential operation of transistor 86 is the first half-cycle of the operation of the D.C. to D.C. converter 10. Similarly, the above given sequential operation of transistor 96 is the second half-cycle of the operation of the D.C. to D.C. converter 10. The time required for the first and second half-cycles determines the frequency of operation of the D.C. to D.C. converter 10.

Transistors 86 and 96 have what is commonly known as commutational losses. Commutational losses are the dissipation losses that occur within a transistor, such as 86 or 96, as it switches from its conductive or switching state to its non-conductive or blocking state which occurs as transformer 52 is sequentially excited into its negative and positive saturation conditions. The rate or the operating frequency of the D.C. to D.C. converter at which transformer 52 is excited into its saturation conditions is dependent upon the rate of change of the magnetic flux density dB/dt of the transformer 52.

The dB/dt quantity is mainly dependent upon the parameters of transformer 52 and the level of the D.C. voltage applied across the primary winding of transformer 52. The dB/dt quantity may be represented by the following relationship, described in the previously mentioned textbook of A. I. Pressman in paragraph 2.4.2 for equation (2-7), and given as;

$$\frac{dB}{dt} \simeq \frac{(V_{cc} - 1) \, 10^{+8}}{N_p A_c} \quad (1)$$

where
$V_{cc}$ = input D.C. input applied to a D.C. to D.C. converter;
$N_p$ = the number of primary turns relative to the center tap of the saturable transformer;
$A_c$ = the transformer core area of a saturable transformer given in square centimeters.

From equation (1) it should be noted that the dB/dt quantity is directly dependent upon the quantity $V_{cc}$ such as the D.C. input voltage connected to terminals 11 and 12 of circuit 10. It should also be noted from the previous discussion that changes to the dB/dt quantity have an effect on the frequency of operation of the D.C. to D.C. converter 10. Increasing the frequency of operation of the D.C. to D.C. converter 10, caused by increases to the applied D.C. voltage, correspondingly increases the repetition rate at which the transistors 86 and 96 are required to switch to and from their conductive or non-conductive states which, in turn, increases the commutational losses of transistors. Also, increases in the applied D.C. voltage correspondingly increase the voltage present across the transistor 86 and 96 during their switching to blocking state, which, in turn, increases their commutational losses. Still further, increases in the applied D.C. voltage correspondingly increase the base drive current to transistors 86 and 96, causing the transistors 86 and 96 to be further driven into their saturation condition requiring a longer time to turn-off due to the storage phenomenon of the transistors, which, in turn, further increases the commutational losses of the transistors 86 and 96.

As discussed in the "Background" section, it is desirable for a D.C. to D.C. voltage converter to receive various or multiple input D.C. voltage having a large deviation in their voltage levels and convert the input D.C. voltages to one desired D.C. output voltage. For example, it is desirable for the D.C. to D.C. voltage converter 10 to receive an input D.C. voltage in the order of 48 V and convert it to an output D.C. voltage in the order of 24 V and also have the capability to receive a higher input D.C. voltage in the order of 125 V and convert it and maintain it at the same desired output D.C. voltage of 24 V. This invention provides a D.C. to D.C. converter 10 for accepting a plurality of input D.C. voltage, such as 48 V. and 125 V. and developing and maintaining a D.C. output voltage such as 24 V. while reducing the increases to the commutational losses of transistors 86 and 96 that may otherwise occur for major and minor positive variations in the received input voltages. This invention controls the base drive current applied to transistor 86 and 96 and thereby controls the rate at which transistors 86 and 96 are driven into their saturation conditions. In general, this invention decreases the rate at which transistors 86 and 96 are driven into saturation for different input levels of the applied D.C. voltage while maintaining the base drive current relatively constant within normal variations at each level of applied D.C. voltage. Decreasing the rate at which the transistors 86 and 96 are driven into their saturation conditions for the increases in the applied D.C. voltage correspondingly decreases the commutational losses of the transistors 86 and 96. This invention provides for the full-wave rectifier 20 and multiple level current limiting circuit 30 combination to adapt the base drive current of transistors 86 and 96 to various levels of the applied D.C. input voltage.

Full-wave rectifier 20, shown in FIG. 1, replaces the previously-discussed resistor 25 (shown in dotted lines). The function of the full-wave rectifier 20 is to receive as an input voltage the A.C. voltage existing across the base drive winding of transformer 52 less the drop across transistor diode combinations 80 and 90 and convert it into a representative D.C. output voltage. The full-wave rectifier comprises four diodes 22, 24, 26 and 28 arranged in a conventional full-wave rectifier configuration. Full-wave rectifier 20 is connected in series with the base drive winding and the transistor-diode combinations 80 and 90 and is interposed between the base electrode of transistor 86 and terminal 60 of the base drive winding of transformer 52 having terminals 60 and 62. One side of the full-wave rectifier 20 is connected to the base of transistor 86 via conductors 27 and 31. The other side of the full-wave rectifier 20 is connected to the base of transistor 96 by a path provided by conductor 37, the base drive winding of transformer 52 having terminals 60 and 62, and the conductor 29. The output of the full-wave rectifier 20 is shown in FIG. 1 as $V_{20}$ and as being applied across the multiple level current limiting circuit 30.

Multiple level current limiting circuit 30 is comprised of a first and a second transistor 32 and 44, respectively, a first diode 38, a first, a second, and a third zener diode 40, 42, and 48, respectively, and a first, second, third, and fourth resistor 34, 36, 46 and 50 respectively. Resistors 34 and 36 and transistor 32 are arranged into a first network. Diode 38 and zener diodes 40 and 42 are arranged into a second network. Zener diode 48, resistors 46 and 50 and transistor 44 are arranged into a third network. Resistor 34 has one input side connected to the collector of transistor 32 and its other side connected to the base of transistor 32. Resistor 36, herein termed and shown as ($R_{36}$) has one side connected to the emitter of transistor 32 and the other or its output side connected to the output of multiple level current limiting circuit 30 shown as an arrow 33 ($I_{36}$). Diode 38 has its anode connected to the base of transistor 32 and its cathode connected to both the collector of transistor 44 and the cathode of the zener diode 40. Zener diode 40 has its anode connected to both the emitter of transistor 44 and to a cathode of the zener diode 42. Zener diode 42 has its anode connected to the output side of resistor 36 and to one side of resistor 50. Resistor 50 has its other side connected to both one side of resistor 46 and an anode of zener diode 48. Resistor 46 has its other side connected to the base of transistor 44. Zener diode 48 has its cathode connected to the input side of resistor 34.

In general, full-wave rectifier 20, multiple level current limiting circuit 30, and the voltage potentials existing between terminals 60 and 62 of the base winding control the amount of base drive current applied to transistors 86 and 96. The base drive current supplied to transistor 86 is developed during the presence of a positive voltage at terminal 60 with respect to terminal 62 which is applied to and circulates about the base of transistor 86 by a path provided by the conductor 37, the diode 26 of diode arrangement 20, the multiple level current circuit 30, the diode 24 of diode arrangement 20, conductors 27 and 31, the base-emitter of transistor 86, the diode 98, conductor 29 and the base drive winding of transformer 52. The amount of base drive current supplied to transistor 86 is primarily determined by the operation of multiple level current limiting circuit 30. Similarly, the base drive current applied to transistor 96 is developed during the presence of a positive voltage at terminal 62 with respect to terminal 60 which is applied to and circulates about the base of transistor 96 by a path provided by the conductor 29, the base-emitter of transistor 96, the diode 88, the conductors 31 and 27, the diode 22 of of the diode arrangement 20, the multiple level current limiting circuit 30, the diode 28 of diode arrangement 20, the conductor 37 and the base drive winding of transformer 52. The amount of base drive current applied to transistor 96 is primarily determined by the operation of multiple level current limiting circuit 30.

An A.C. voltage is developed across the base drive winding having terminals 60 and 62 which is used to drive transistors 86 and 96 into saturation on alternate half-cycles of the D.C. to D.C. converter 10. The load of the base drive winding is primarily the multiple level current limiting circuit 30. Multiple level current limiting circuit 30 (1) holds or limits its output current to a first relatively constant value over a range of first input D.C. voltages, and (2) lowers and limits its output current to a second relatively constant value over a range of second input D.C. voltages which are higher than the first input D.C. voltages.

The base drive current for both transistors 86 and 96 is derived from the A.C. voltages present across the base drive winding of transformer 52. Primarily the multiple level current limiting circuit 30 develops the output current $I_{36}$ which adapts the amount of base drive current to minor and major changes in the level of D.C. input voltage.

Figure 2:
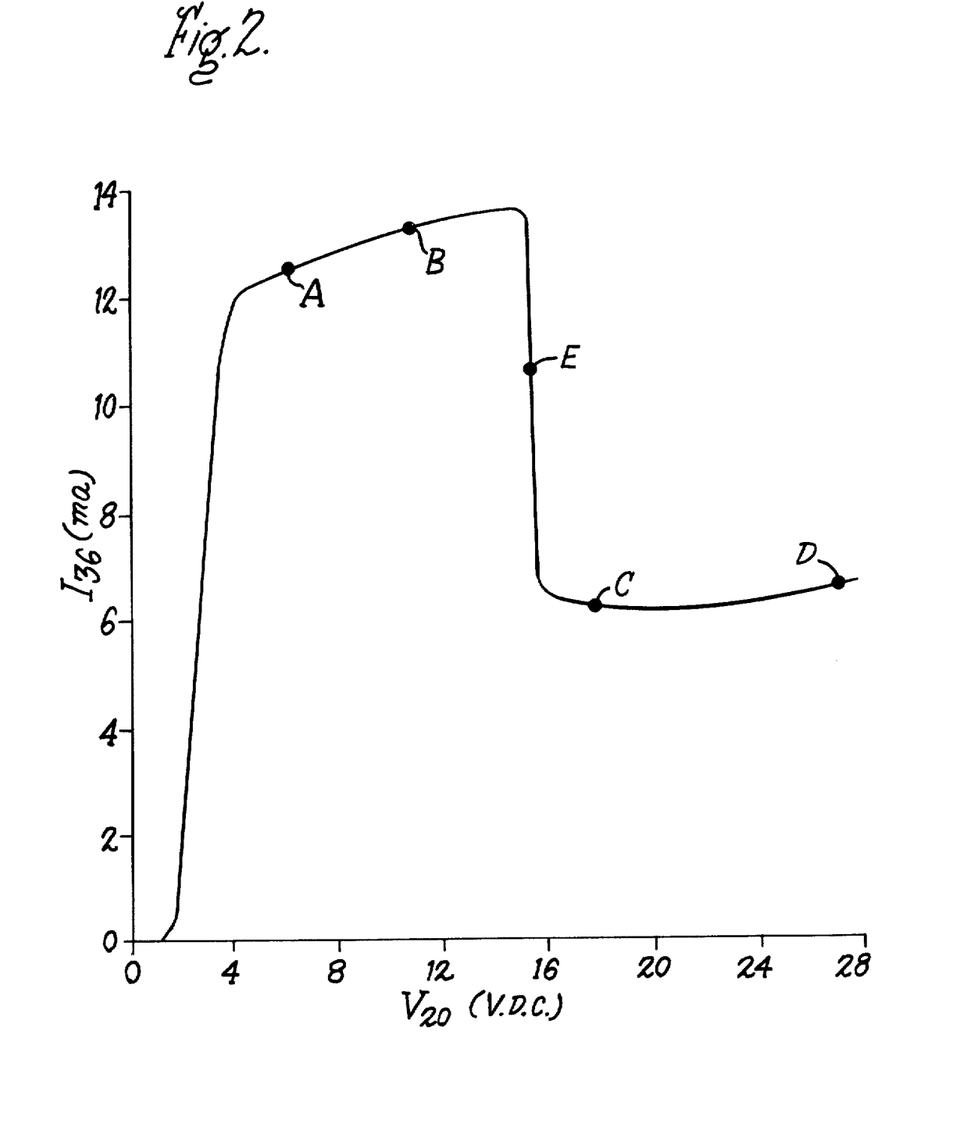
FIG. 2 shows a related voltage vs. current response of one embodiment of the present invention.

A plot of the current $I_{36}$ of the multiple level current limiting circuit 30 versus the D.C. voltage drop $V_{20}$ across the multiple level current limiting circuit 30 is shown in FIG. 2. The current $I_{36}$ is plotted on the Y axis of FIG. 2 and the D.C. voltage drop $V_{20}$ is plotted along the X-axis. FIG. 2 shows four (4) points A, B, C and D which corresponds to various operating conditions of the D.C. to D.C. converter 10. Points A and B represent the range of the $I_{36}$ and $V_{20}$ values developed by the application of a 48 V D.C. input voltage to the converter 10. The 48 V D.C. input voltage may typically have minimum and maximum values of 38 V and 54 V respectively. Points C and D represent the range of $I_{36}$ and $V_{20}$ values developed by the application of a 125 V D.C. input voltage to the converter 10. The 125 V D.C. input voltage may typically have minimum and maximum values of 87 V and 140 V respectively. The transitional zone from the operational ranges for 48 V D.C. and the 125 V D.C. is generally represented by a steeply sloped line through point E having a value of $V_{20}$ equal to approximately 15 V. D.C. Points A, B, C and D typically have $I_{36}$-$V_{20}$ values of 12.3 ma-6.2 V. D.C., 13.1 ma-11.4 V. D.C., 6.0 ma-17.5 V. D.C., and 6.3 ma-26.0 V. D.C. respectively.

The high and low limits of the current $I_{36}$ is essentially determined by the conductive states of zener diode 48 and transistor 44 both shown in FIG. 1. The voltage $V_{20}$ of full-wave rectifier 20 is applied across zener diode 48 and resistor 50. If the voltage $V_{20}$ does not exceed a predetermined value having a typical value of 15.0 V D.C., (Line E, FIG. 2), zener diode 48 is non-conductive. The zener diode 48 conduction voltage, that is, the voltage necessary to be applied across zener diode 48 to render it conductive and the resistive value of resistor 50 are selected to correspond to this predetermined value of voltage $V_{20}$. Zener diode 48 in its non-conductive state inhibits conduction of transistor 44. For the non-conductive state of transistor 44 the following three (3) conditions exist; (1) transistor 32 is conductive, (2) diode 38 is conductive, and (3) the series arrangement of zener diodes 40 and 42 have a combined voltage drop equal to $V_{40}+V_{42}$ which is essentially the voltage drop across resistor 36. For this condition the approximate current ($I_{36}$), which is routed to transistor 86 and 96 by full-wave rectifier 20, may be represented as:

$$I_{36} \approx \frac{V_{40} + V_{42}}{R_{36}} \quad (2)$$

If the voltage $V_{20}$ applied across zener diode 48 and resistor 50 exceeds the typical predetermined voltage of 15.0 V. D.C., zener diode 48 is rendered conductive which in turn renders transistor 44 conductive. The conduction of transistor 44 in turn provides a path to bypass or short-circuit zener diode 40 which reduces the voltage across resistor 36. The approximate current ($I_{36}$) flowing through resistor 36 for this condition may be represented as:

$$I_{36} \approx \frac{V_{42}}{R_{36}} \quad (3)$$

Equation (2) is representative of the current of $I_{36}$, shown in FIG. 2, for the range A-B corresponding to the application of 48 V. D.C. to the D.C. to D.C. converter 10. Equation (3) is representative of the current of $I_{36}$, shown in FIG. 2, for the range C-D corresponding to the application of 125 V. D.C. to the D.C. to D.C. converter 10. A comparison between currents $I_{36}$ shown in FIG. 2 will reveal that currents $I_{36}$ for the 125 V range are substantially lower than the currents $I_{36}$ related to the 48 V range. When the higher input voltage such as 125 V D.C. is applied to the D.C. to D.C. converter, the switchable means 67, shown in FIG. 1, is positioned to tap 66 thereby reducing the amount of turns of the secondary winding. For this condition, the amount of primary current needed to supply the 24 V D.C. output load is now lower relative to the application of the input 48 V D.C. level. Correspondingly, the base drive current, representative of current $I_{36}$, desired for transistors 86 and 96 is reduced. The effect of this reduction is that increase in the commutational losses of transistors 86 and 96 normally occurring when the range of applied D.C. input voltage is increased from 48 V D.C. to 125 V D.C. is reduced.

It should be noted that the currents $I_{36}$ shown in FIG. 2 operating with $V_{20}$ in the 48 V and 125 V ranges stays relatively constant for the 48 V range and for the 125 V range and is reduced at 125 V when compared to 48 V. This is of particular importance when compared to the prior art devices having the previously described resistor 25. The use of resistor 25 would have developed base drive currents that would increase essentially in a linear manner as the level of D.C. input voltage increased. These linearly-increasing base drive currents would have correspondingly increased the commutational losses of the switching transistors 86 and 96. Furthermore, the voltage drop across the resistor 25 would have produced a larger increase in losses with an increase in voltage compared to that of circuit 30.

The overall operation of the D.C. to D.C. converter 10 is given by the following interrelated conditions; (1) if the D.C. input voltage applied to terminals 11 and 12 increases or decreases it correspondingly causes; (2) the voltages existing between terminals 60 and 62 of the base winding of transformer 52 to correspondingly increase or decrease; (3) the full-wave rectifier 20 provides a voltage $V_{20}$ to the multiple level current limiting circuit 30 that correspondingly increases or decreases; (4) the multiple level current limiting circuit 30 monitors the increases or decreases and supplies the current $I_{36}$ which is coupled to the base of transistor 86 or 96 as base drive current and is representative of the increases or decreases; (5) the base drive current to transistor 86 or 96 correspondingly increases or decreases the amount transistors 86 or 96 are driven into saturation; (6) adapting the saturation condition of transistors 86 and 96 to the increases or decreases of the applied D.C. voltage to the D.C. to D.C. converter 10 correspondingly adapts or minimizes the commutational losses of transistors 86 and 96 which would otherwise normally occur for such variations in the applied D.C. voltage.

It should now be appreciated that multiple level current limiting circuit 30 in conjunction with the full-wave rectifier 20 provides a base drive current to transistors 86 and 96 that switches the D.C. input voltage applied across terminals 11 and 12 to transformer 52 to develop a D.C. output voltage between output terminals 14 and 16 while reducing the increases in the commutational losses of the switching transistors 86 and 96 that normally otherwise occur for increases in the applied D.C. input voltage. The D.C. to D.C. converter 10 provides the capability of receiving and operating efficiently with two widely separated D.C. voltages, one being a 48 V. D.C. voltage, and the other being a 125 V. D.C. voltage.

It should be recognized that the operation of the D.C. to D.C. converter 10 is not limited to the application of only the 48 V. D.C. and 125 V. D.C. voltages. The D.C. to D.C. converter 10 by appropriate selection of its circuit components, in particular, the zener diode 48, may be arranged to operate with various applied D.C. voltages. Still further, the D.C. to D.C. converter 10 is not limited to the application of only two separate input D.C. voltages. The D.C. to D.C. converter 10 may be provided with additional paths, similar to the path provided by the third network comprised of zener diode 48, resistors 46 and 50, and transistor 44 arranged across a zener diode such as the first zener diode 40, and having selected values to correspondingly accommodate additional applied input D.C. voltages such as 24 V. D.C. or 250 V. D.C.

Figure 3:
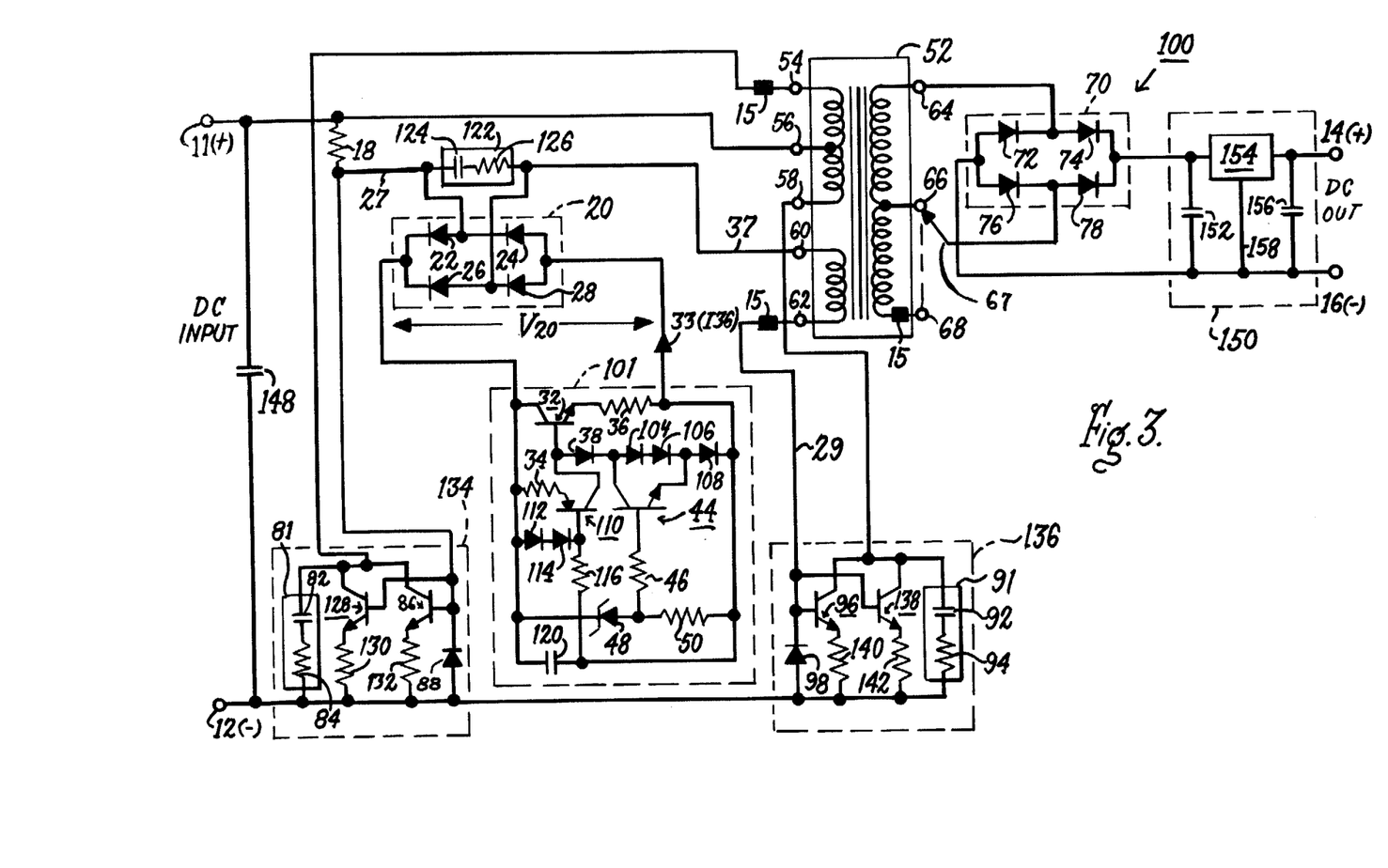
FIG. 3 is a circuit diagram of another embodiment of the base drive circuit of the present invention.

A second embodiment of the present invention is shown in FIG. 3 as a D.C. to D.C. voltage converter 100. The D.C. to D.C. converter 100 of FIG. 3 is comprised, in part, of circuit components similar to and having the same reference numbers as the circuit components previously described for the D.C. to D.C. voltage converter 10, and therefore these circuit components will not be further described.

The D.C. to D.C. converter 100 applies the D.C. output voltage of the full-wave rectifier to a network 150. Network 150 filters and regulates the D.C. output voltage of the full-wave rectifier 70 and applies it across terminals 14 and 16. The regulation of network 150 provides for a relatively constant D.C. output voltage over a range of values of the applied D.C. input voltages. Network 150 is comprised of two capacitors 152 and 156, both positioned in a parallel arrangement across an integrated circuit 154. Integrated circuit 154 may be of the type LM240L supplied by National Semiconductor Corp., of 2900 Semiconductor Drive, Santa Clara, Calif. 95051.

The D.C. to D.C. converter 100 also has a capacitor 148, shown in FIG. 3, arranged across terminals 11 and 12, to provide for filtering of the D.C. input source. The D.C. to D.C. converter 100 also comprises an RC network 122 having a serially-arranged capacitor 124 and resistor 126. The RC network 122 is interconnected between terminal 60 of transformer 52 and the starting resistor 18. One side of resistor 126 which serves as the input side of network 122 is connected to the cathode of diode 28, whereas the one side of capacitor 124 which serves as the output side of network 122 is connected to the anode of diode 22. Network 122 is initially charged to the voltage existing between terminal 60 and resistor 18 and its function is to quickly discharge through the base of transistors 86 and 128 or the base of transistors 96 and 138 when the transformer 52 changes polarity in order to decrease the turn-on time of the transistors 86, 96, 128 and 138.

Transistors 128 and 138 form part of transistor diode combinations 134 and 136 respectively. Transistor diode combinations 134 and 136 perform similar functions as the previously described transistor-diode combinations 80 and 90. Transistor diode combination 134 comprises a parallel arrangement of transistors 86 and 128 having emitter resistors 130 and 132, respectively, a snubber circuit 81 and the previously described diode 88. Transistor diode combination 136 comprises a parallel arrangement of transistors 96 and 138 having emitter resistors 140 and 142, respectively, a snubber circuit 91 and the previously described diode 98. Transistor 128 and 138 are connected in parallel with transistors 86 and 96, respectively, to increase the level of primary currents that are applied to the saturation transformer 52. The increased current is desirable for operation of the D.C. to D.C. voltage converter 100 due to the transformer 52 requiring more than twice the current for the 48 V. D.C. input voltage in order to supply the same secondary current to develop the desired D.C. output voltage.

Snubber circuits 81 and 91 are well known in the art and comprise serially arranged resistors and capacitors 82, 84 and 92, 94, respectively. Snubber circuits 81 and 91 provide transient suppression for the transients conditions that transistors 86, 128 and 96, 138, respectively, may be subjected. Snubber circuit 81 is connected between the collectors of transistors 86 and 128 and terminal 12. Similarly, snubber circuit 91 is connected between the collectors of transistors 96 and 138 and terminal 12.

The full-wave rectifier 20 of FIG. 3 has the same structure, interconnections and operation as previously described with regard to FIG. 1. However, multiple level current limiting circuit 101 of FIG. 3 while having the same interconnections and operation of the previously described multiple level current limiting circuit 30 of FIG. 1, has a structure which is different from the structure of circuit 30 of FIG. 1 and therefore circuit 101 requires further discussion.

The multiple level current limiting circuit 101 has added a transistor 110, a serially arranged diodes 112 and 114, a resistor 116 and a capacitor 120. Multiple level current limiting circuit 101 has replaced the previously discussed zener diodes 40 and 42 of FIG. 1 with silicon-type diodes 104–106 and 108 respectively. Transistor 110 has its emitter connected to the output side of resistor 34, its collector connected to the anode of the diode 38, and its base connected to a parallel arrangement having a first branch formed by the serially arranged diodes 112 and 114 and a second branch formed by the resistor 116. Resistor 116 has its other end connected to one side of capacitor 120 which provides filtering of the voltage $V_{20}$ for the multiple level current limiting circuit 101. The arrangement of transistor 110, diodes 112 and 114, and resistor 116 performs two functions; (1) it supplies a relatively fixed current for diodes 38, 104, 106 and 108, and (2) it reduces the losses of resistor 34 that may otherwise occur during the operation of the multiple level current limiting circuit 101 with the application of the 125 V. D.C. input voltage. The operation of drive circuit 101 is essentially the same as described for circuit 30 of FIG. 1 except for the additional features provided by the additional components of circuit 101. The overall operation of the D.C. to D.C. converter 100 is similar to the previously described overall operation of the D.C. to D.C. converter 10 and thus provides a D.C. to D.C. converter that operates efficiently with various applied D.C. voltages having a large variation in their D.C. voltage levels. Additionally, the D.C. to D.C. converter 100 provides (1) a regulated and filtered D.C. output voltage across terminals 14 and 16, (2) a filtered D.C. input voltage applied across terminals 11 and 12, and (3) transient suppression means for the transistor switching devices.

Although D.C. to D.C. converters 10 and 100 have been described for the use of NPN type transistors for transistors 86, 96, 128 and 138 it would be apparent to one skilled in the art that other type transistors may be used by appropriate circuit interconnections.

It should now be appreciated that each of the circuit arrangements 10 and 100 provides a D.C. to D.C. converter that converts various input D.C. voltages to a desired D.C. output voltage while reducing the increase in commutational losses of the transistor switching means that may otherwise normally occur for input D.C. voltages having an increase in major or minor variations in their D.C. voltage level.

While I have shown and described particular embodiments of my invention, it will be obvious to those skilled in the art that various changes and modifications may be made without departing from my invention in its broader aspects; and I, therefore, intend herein to cover all such changes and modifications as fall within the true spirit and scope of my invention.

What is claimed is:

1. In a D.C. to D.C. voltage converter adapted for energization by various input D.C. voltages each having different D.C. voltage levels relative to each other and each having a positive and negative potential, said positive potential being connected to a center-tap of a primary winding of a saturable transformer, said saturable transformer having a first secondary or base drive winding having a first and a second end and a second secondary winding having a first and a second end with a tap positionable between its first and second ends, said saturable transformer having a core with a substantially square magnetic hysteresis loop characteristic, said negative potential being connected to first and a second transistor diode combinations, each comprising a transistor having a base electrode, said first and said second transistor diode combinations sequentially operating to couple said negative potential to opposite ends of said primary winding causing the core of the saturable transformer to be sequentially excited into its positive and its negative saturation conditions, said first and second transistor diode combinations being controlled by a base drive circuit having a starting resistor with a first end connected to said positive potential and a second end, said base drive circuit being arranged in series with the transistor diode combinations and said base drive winding of said saturable transformer, said base drive winding having an A.C. voltage across its first and second ends representative of the D.C. voltage present at a said primary winding, said second end of said base drive winding being coupled to said base electrode of said second transistor diode combination, said base drive winding voltage experiencing a rapid reversal as the transformer is excited into its negative and positive saturation conditions, said rapid reversal causing the base drive circuit to sequentially render conductive and non-conductive the first and the second transistor diode combinations, said sequential conduction of said first and second transistor diode combinations allowing said transformer to be sequentially driven into its saturation conditions, which, in turn, develops a time-varying signal at the second secondary winding of said transformer which is rectified by an A.C. to D.C. rectifier to develop a desired D.C. output voltage, said base drive circuit further comprising:

means for converting said A.C. voltage of said base drive winding into a representative D.C. output voltage, said means for converting having a first end coupled to said first end of said base drive winding and a second end coupled to said second end of said starting resistor and to said base electrode of said first transistor diode combination, said D.C. output voltage of said means for converting being coupled across a multiple level current limiting circuit;

said multiple level current limiting circuit developing a current representative of said coupled D.C. output voltage, said current having a first and a second range representative of a first and a second range of said coupled D.C. output voltage, said first and second ranges of said coupled D.C. output voltage being respectively representative of a range of D.C. voltage levels of a first input D.C. voltage and a range of D.C. voltage levels of a second input D.C. voltage;

said means for converting and said multiple level current limiting circuit being arranged to supply as a base drive current said first and second ranges of currents to said base electrodes of said first and second transistor diode combinations, said first and second ranges of currents correspondingly controlling the saturation condition of said first and second transistor diode combinations, said first and second ranges of currents being such as to adapt the saturation condition of said first and second transistor diode combinations to the ranges of said first and second input D.C. voltages;

said adaptation of said saturation condition of said first and second transistor diode combinations to the first and second input D.C. voltages applied to said D.C. to D.C. converter reduces the extent of any increase to the commutational losses for each of the first and second transistor diode combinations that would otherwise occur for major and minor positive increases in the D.C. voltage levels of the applied first and second D.C. voltages.

2. A D.C. to D.C. converter according to claim 1 wherein said means for converting said A.C. voltage of said base drive winding into a representative D.C. output voltage comprises a plurality of diodes arranged in full-wave rectifier configuration.

3. A D.C. to D.C. converter according to claim 1 wherein said multiple level current limiting circuit comprises:

a first and second and a third network interconnected across a first and a second terminal having impressed therebetween said D.C. output voltage of said means for converting, said first network comprising a first resistor, a first transistor and a second resistor, said first resistor connected between said first terminal and a base electrode of said first transistor, said first transistor having its collector electrode connected to said first terminal and its emitter electrode connected to a first end of said second resistor, said second resistor having its second end connected to said second terminal;

said second network comprising a diode and a first and a second zener diode, each of said zener diodes having a predetermined conduction voltage and a first and a second end, said diode and said first and second zener diodes being serially connected between said base electrode of said first transistor and said second terminal; said second network providing a parallel path across said second resistor having a predetermined voltage dependent upon the conduction voltages of said first and second zener diodes, said parallel path being provided upon conduction of said first transistor;

said third network comprising a third zener diode having a predetermined conduction voltage, a third and a fourth resistor, and a second transistor, said third zener diode connected between said first terminal and a first end of both said third and fourth resistors, said third resistor having its other end connected to a base electrode of said second transistor, said fourth resistor having its other end connected to said second terminal, said second transistor having its collector electrode and its emitter electrode connected across said first zener diode, said third zener diode and said fourth resistor being arranged to render said second transistor conductive when said D.C. output voltage exceeds a predetermined voltage range, said second transistor being arranged to effectively short out said first zener diode from said parallel path across said second resistor;

said arrangement of said first, second and third networks developing said first range of currents when said D.C. output voltage is less than said predetermined voltage range, said first range of currents having values determined by the summation of said predetermined conduction voltages of said first and second zener diodes divided by the resistive value of said second resistor, said arrangement of said first, second and third networks further developing said second range of currents when said D.C. output voltage is equal to or exceeds said predetermined voltage range, said second range of currents having values determined by said predetermined conduction voltage of said second zener diode divided by the resistive value of said second resistor.

4. A D.C. to D.C. converter according to claim 3 wherein said input D.C. voltage comprises a plurality of input D.C. voltages, said plurality of input voltages having a first and a second input D.C. voltage for developing said first and second ranges of currents of said first, second and third networks, each of the remainder of said plurality of input voltages having an additional third network interconnected across an additional first zener diode which is serially arranged with said first and second zener diodes, each of said additional third network and additional first zener diode having values selected to develop a range of currents representative of each of the remainder of said plurality of input voltages.

5. A D.C. to D.C. converter according to claim 3 or claim 4 further comprising a fourth network;

said fourth network comprising a serially arranged second diode, a third diode, a first capacitor, a fifth resistor and a third transistor, said third transistor being interposed between said first resistor and said base of said first transistor, said third transistor having its emitter electrode and its collector electrode respectively interposed between said first resistor and said base electrode of said first transistor, said third transistor having its base electrode connected to one end of said serially arranged second and third diodes and to one end of said fifth resistor, said serially arranged second and third diodes having its other end connected to said first terminal, said fifth resistor having its other end connected to said second terminal and one end of said first capacitor which has its other end connected to said first terminal.

6. A D.C. to D.C. converter according to claim 3 or claim 4 further comprising a filtering and regulator circuit positioned across said desired D.C. output voltage to provide a filtered and regulated desired D.C. output voltage.

* * * * *